(12) United States Patent
Patton et al.

(10) Patent No.: US 12,556,795 B2
(45) Date of Patent: Feb. 17, 2026

(54) FOLDING PRINTED CIRCUIT BOARD ASSEMBLY FOR ENDOSCOPE CAMERA

(71) Applicant: Covidien LP, Mansfield, MA (US)

(72) Inventors: Craig Allen Patton, Boulder, CO (US); Derek S. Tata, Longmont, CO (US); Shai Tofach, Louisville, CO (US)

(73) Assignee: Covidien LP, Mansfield, MA (US)

(*) Notice: Subject to any disclaimer, the term of this patent is extended or adjusted under 35 U.S.C. 154(b) by 25 days.

(21) Appl. No.: 18/779,629

(22) Filed: Jul. 22, 2024

(65) Prior Publication Data

US 2025/0080822 A1 Mar. 6, 2025

Related U.S. Application Data

(60) Provisional application No. 63/580,170, filed on Sep. 1, 2023.

(51) Int. Cl.
*H04N 23/50* (2023.01)
*H05K 1/189* (2026.01)

(52) U.S. Cl.
CPC ............ *H04N 23/555* (2023.01); *H05K 1/189* (2013.01); *H05K 2201/10121* (2013.01); *H05K 2201/10151* (2013.01)

(58) Field of Classification Search
CPC .............. H04N 23/555; H05K 1/189; H05K 2201/10121; H05K 2201/10151
See application file for complete search history.

(56) References Cited

U.S. PATENT DOCUMENTS

| | | | |
|---|---|---|---|
| 4,741,327 A | 5/1988 | Yabe | |
| 6,002,437 A | 12/1999 | Morioka | |
| 10,499,799 B2 | 12/2019 | Unsai | |
| 10,616,491 B2 * | 4/2020 | Haggerty | A61B 1/051 |
| 10,925,464 B2 * | 2/2021 | Sekido | H04N 23/50 |
| 2009/0268019 A1 | 10/2009 | Ishii | |

(Continued)

FOREIGN PATENT DOCUMENTS

| | | |
|---|---|---|
| CN | 203417184 U | 2/2014 |
| CN | 207785128 | 8/2018 |

(Continued)

OTHER PUBLICATIONS

International Search Report for International Application No. PCT/IB2024/058292 mailed Nov. 27, 2024 (11 pages).

*Primary Examiner* — Sunghyoun Park

(57) ABSTRACT

The technology relates to a flexible printed circuit board (PCB) that is incorporated into a steerable tip of an endoscope. The endoscope includes a working channel extending through the steerable tip; a foldable printed circuit board (PCB) extending at least partially around the working channel. The foldable PCB includes a planar sensor segment extending along a first plane, the sensor segment populated with at least one sensor; a planar camera segment extending along a second plane that is substantially orthogonal to the first plane and positioned distally from the sensor segment, the camera segment including an opening for the working channel and populated with a camera and at least one light source, wherein the planar camera segment is partially separated from the sensor segment by an aperture in the foldable PCB; and a bent arm extending between, and connecting, the sensor segment and the camera segment.

15 Claims, 5 Drawing Sheets

(56) References Cited

U.S. PATENT DOCUMENTS

| | | |
|---|---|---|
| 2011/0249106 A1 | 10/2011 | Makino |
| 2011/0263942 A1 | 10/2011 | Chen |
| 2012/0197081 A1 | 8/2012 | Kimura |
| 2013/0188030 A1 | 7/2013 | Igarashi |
| 2013/0271588 A1 | 10/2013 | Kirma et al. |
| 2014/0309495 A1 | 10/2014 | Kirma |
| 2015/0378144 A1 | 12/2015 | Handte |
| 2017/0157361 A1 | 6/2017 | Barrish |
| 2019/0125631 A1 | 5/2019 | Allyn |
| 2019/0328217 A1 | 10/2019 | Moreau |
| 2020/0138271 A1 | 5/2020 | Toth |
| 2020/0196434 A1 | 6/2020 | Kuo et al. |
| 2020/0254204 A1 | 8/2020 | Moffat et al. |
| 2020/0288953 A1 | 9/2020 | Sørensen |
| 2020/0305699 A1 | 10/2020 | Herriges |
| 2021/0052140 A1 | 2/2021 | Tata |
| 2021/0068640 A1 | 3/2021 | Sørensen |
| 2021/0153723 A1 | 5/2021 | Yip |
| 2021/0338062 A1 | 11/2021 | Do |
| 2021/0338067 A1 | 11/2021 | Mao |
| 2022/0057621 A1 | 2/2022 | Aizenfeld |
| 2022/0287546 A1 | 9/2022 | Sørensen |
| 2022/0395166 A1 | 12/2022 | Craig |
| 2023/0045555 A1* | 2/2023 | Kirma .................... A61B 1/042 |
| 2023/0105241 A1 | 4/2023 | Craig |
| 2023/0123867 A1 | 4/2023 | Herda |
| 2024/0373555 A1* | 11/2024 | Greenburg ............. H05K 1/189 |

FOREIGN PATENT DOCUMENTS

| | | |
|---|---|---|
| DE | 102017102178 | 6/2018 |
| EP | 3788943 | 3/2021 |
| GB | 2596125 | 12/2021 |
| JP | 11216102 | 8/1999 |
| JP | 11252418 | 9/1999 |
| JP | 2011200398 | 10/2011 |
| JP | 7157024 B2 | 10/2022 |
| WO | 2020178093 | 9/2020 |
| WO | 2022101137 | 5/2022 |
| WO | 2022/133248 A1 | 6/2022 |
| WO | 2022172192 | 8/2022 |
| WO | 2022/266500 A1 | 12/2022 |

* cited by examiner

FOLDING PRINTED CIRCUIT BOARD ASSEMBLY FOR ENDOSCOPE CAMERA

CROSS-REFERENCE TO RELATED APPLICATIONS

This application claims the benefit of U.S. Provisional Application No. 63/580,170 filed Sep. 1, 2023, titled "Folding Printed Circuit Board Assembly for Endoscope Camera," which is incorporated herein by reference in its entirety.

BACKGROUND

An endoscope is a narrow flexible tube that includes a camera and light source integrated into a steerable distal tip, which is inserted into a patient's body and used to view tissue and anatomical structures of the patient. The steerable tip is controlled by a clinician using a control device connected to the proximal end of the endoscope, which remains outside the body. The clinician may view images from the endoscope on a display associated with the control device. The camera and light source, along with sensors and other electrical components, are installed in the steerable tip.

It is with respect to this general technical environment that aspects of the present technology disclosed herein have been contemplated. Furthermore, although a general environment is discussed, it should be understood that the examples described herein should not be limited to the general environment identified herein.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description, or may be learned by practice of the disclosure.

In an aspect, the technology relates to an endoscope with a steerable tip. The endoscope includes a working channel extending through the steerable tip; a foldable printed circuit board (PCB) extending at least partially around the working channel. The foldable PCB includes a planar sensor segment extending along a first plane, the sensor segment populated with at least one sensor; a planar camera segment extending along a second plane that is substantially orthogonal to the first plane and positioned distally from the sensor segment, the camera segment including an opening for the working channel and populated with a camera and at least one light source, wherein the planar camera segment is partially separated from the sensor segment by an aperture in the foldable PCB; and a bent arm extending between, and connecting, the sensor segment and the camera segment.

In an example, the bent arm is a first bent arm, and the flexible PCB further comprises a second bent arm extending between the sensor segment and the camera segment, wherein the aperture is positioned between the first bent arm and the second bent arm. In another example, the bent arm is a first bent arm, and wherein the flexible PCB further includes a planar wiring segment including an attached wire that extends through the endoscope, the wiring segment extending along a third plane that is substantially orthogonal to the first plane and the second plane; and a second bent arm extending between the sensor segment and the wiring segment. In a further example, the wiring segment is a first wiring segment and the wire is a first wire, wherein the flexible PCB further includes a planar second wiring segment including an attached second wire extending though the endoscope, wherein the second wiring segment extends along a fourth plane that is substantially parallel to the third plane; and a third bent arm extending between the second wiring segment the sensor segment. In a still further example, the aperture is a first aperture; the first wiring segment is positioned laterally from the sensor segment and is partially separated from the sensor segment by a second aperture in the flexible PCB; and the second wiring segment is positioned laterally from the sensor segment and is partially separated from the sensor segment by a third aperture in the flexible PCB. In yet another example, the sensor includes at least one of an inertial measurement unit (IMU), an accelerometer, or a gyroscope. In still another example, the camera is positioned between the opening and the aperture, and the at least one light source includes a first light source positioned on a first lateral side of the camera and a second light source positioned on a second lateral side of the camera. In still yet another example, the first wiring segment comprises at least two wire pads, and the second wiring segment comprises at least two wire pads.

In another aspect, the technology relates to a foldable printed circuit board (PCB) for inclusion in a steerable tip of an endoscope, the foldable PCB having a two-dimensional configuration and a three-dimensional configuration. The PCB includes a first bendable arm, a second bendable arm, and a third bendable arm; a planar sensor segment populated with at least one of an inertial measurement unit (IMU), an accelerometer, or a gyroscope; a planar camera segment positioned distally from the sensor segment and connected to the sensor segment via the first bendable arm, the planar camera segment populated with a camera and at least one light source, wherein the camera segment is partially separated from the sensor segment by an aperture; a first wiring segment positioned laterally from the sensor segment and proximally from the camera segment, the first wiring segment connected to the sensor segment via the second bendable arm and including at least two wiring pads; and a second wiring segment positioned laterally from the sensor segment and proximally from the camera segment, the second wiring segment connected to the sensor segment via the third bendable arm and including at least two wiring pads.

In an example, the aperture is a first aperture; the first wiring segment is partially separated from the sensor segment by a second aperture; and the second wiring segment is partially separated from the sensor segment by a third aperture. In another example, the first aperture is defined by the first bendable arm, a fourth bendable arm, the sensor segment and the camera segment. In still another example, the camera segment further includes an opening sized to allow for a working channel of the endoscope to pass through. In a further example, the camera is positioned between the opening and the aperture. In a still further example, the at least one light source includes a first light source positioned on first lateral side of the camera and a second light source positioned on a second lateral side of the camera. In yet another example, when the foldable PCB is in the three-dimensional configuration: the planar sensor segment extends along a first plane; and the camera segment extends along a second plane that is substantially orthogonal to the first plane.

BRIEF DESCRIPTION OF THE DRAWINGS

The following drawing figures, which form a part of this application, are illustrative of aspects of systems and methods described below and are not meant to limit the scope of the disclosure in any manner, which scope shall be based on the claims.

DETAILED DESCRIPTION

Figure 1:
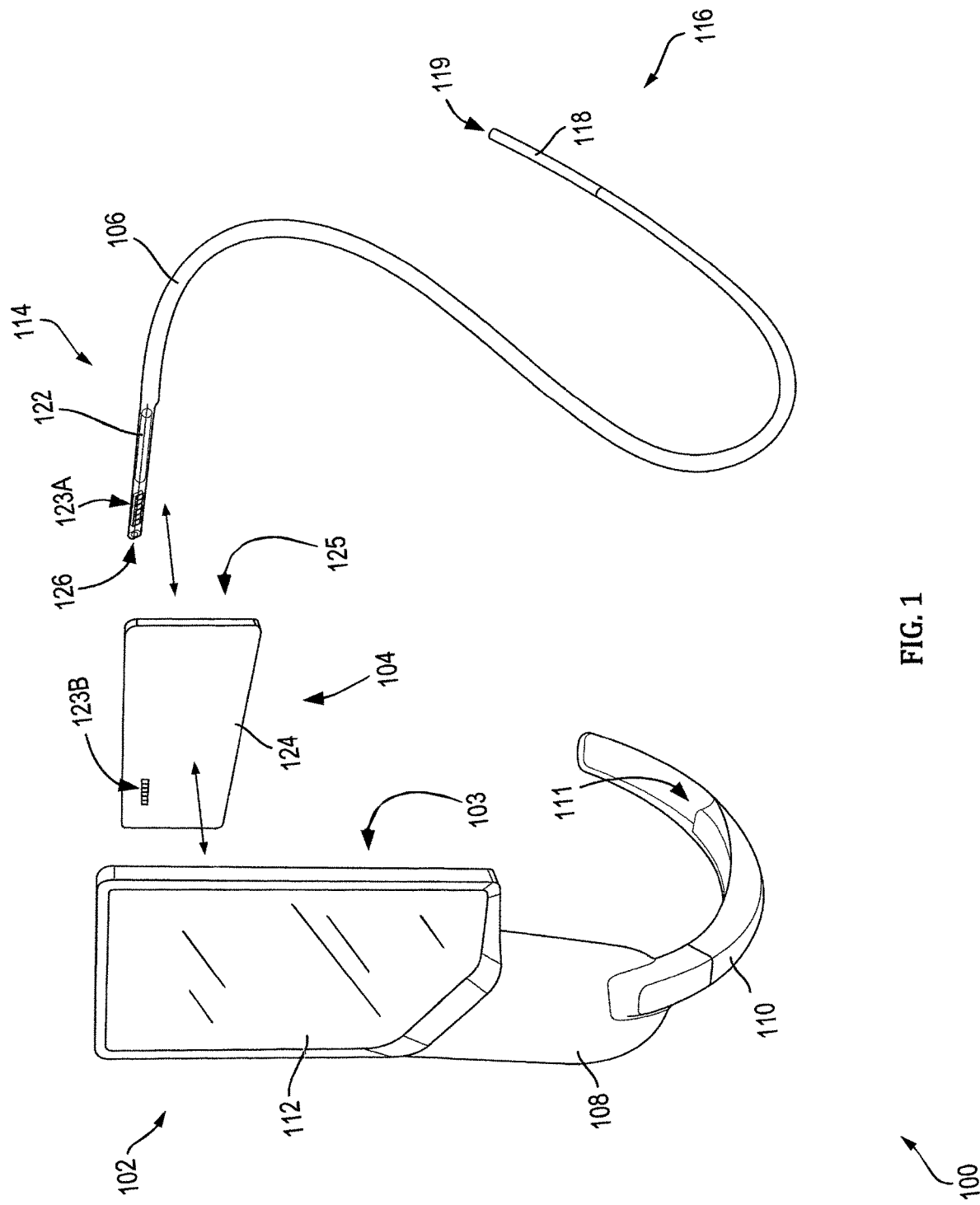
FIG. 1 depicts an example video system that includes a steerable endoscope.

A medical endoscope is a narrow, flexible tube that includes a video camera system integrated into a steerable distal tip that is inserted into the patient's body. The proximal end of the endoscope remains outside of the body and is connected to a control device that allows a clinician to steer the distal tip and view video images acquired by the camera system. The endoscope may be navigated into an anatomical lumen or other cavity of a patient, such as the patient's airway, gastrointestinal (GI) tract, or another cavity. When navigated to a location of interest, the clinician may use the control device to articulate the endoscope steerable tip to establish a viewpoint of an anatomical structure or other biological matter. In one example, the endoscope may be used in conjunction with a laryngoscope to establish a viewpoint of the larynx of a patient, which may facilitate insertion of an endotracheal tube during an intubation procedure.

The endoscope camera system may include a camera and one or more light sources, such as light-emitting diodes (LEDs), that are attached to a printed circuit board (PCB) mounted within the steerable tip. The PCB may be mounted to direct the field-of-view of the camera, and the light emitted by the LEDs, out of the distal end of the endoscope steerable tip and into the patient cavity. The steerable tip may further include sensors, such as an accelerometer, gyroscope, or inertial measurement unit (IMU), which provides measurement data associated with the acceleration, rotation, position, and/or other variables associated with motion of the steerable tip. In some examples, the sensor(s) may be attached to a second PCB mounted within the endoscope steerable tip, while in other examples, the sensor(s) may be attached to the same PCB as the camera system.

The control device may use the image data provided by the camera and the motion data provided by the IMU to determine changes in the position and/or orientation of the steerable tip. The control device may provide information on positional/orientational changes to the clinician, and in some examples may provide corrective steering signals to the endoscope. Accordingly, the IMU and camera may be arranged on their respective PCBs (or on the same PCB), and the PCBs may be arranged relative to one another, such that the orientation between the IMU and camera is fixed and known, and the data provided by each of the camera and IMU can be appropriately correlated.

The endoscope may also include an internal channel that passes from the proximal end (where the channel is accessible to the clinician) to the distal tip of the endoscope (where the channel opens to a patient cavity). This channel, which may be referred to as a working channel, provides additional functionality to the endoscope. For example, the working channel may be used during some procedures to apply a topicalizing agent (e.g., lidocaine or other local anesthetic) to reduce patient discomfort and anxiety during the procedure. In other examples the working channel may be used for passing small instruments, such as tissue sampling instruments, catheters, or other types of instruments.

The presence of the working channel, in combination with the camera system, IMU, and any other electrical components, may significantly limit the volume available for mounting one or more of the PCBs in the steerable tip. For example, a typical rigid PCB may be fabricated from any of a variety of reinforced epoxy laminates (e.g., FR-4) or other types of material that form a PCB substrate with a thick cross-section. In some examples, a rigid PCB may be as thick as 0.8 mm or more, which may not be accommodated in the limited volume available in the endoscope steerable tip. In examples where two PCBs are included in the endoscope steerable tip, such as when the camera system and sensor(s) are attached to different PCBs, space limitations are further exacerbated.

As described herein, the present technology relates to systems and methods for using a single flexible PCB to mount a camera system, IMU, and associated elements within the steerable tip of an endoscope. The flexible PCB includes flexible regions designed to allow the PCB to be reconfigured from a substantially two-dimensional (2D) configuration to a three-dimensional (3D) configuration, so that the PCB may be mounted within a space-constrained steerable tip. The substrate material used to fabricate the PCB results in substantially reduced cross-sectional thickness, which also facilitates installation of the PCB in the endoscope steerable tip. The PCB, along with mounting elements in the steerable tip, may provide alignment benefits for fixing the orientation of the camera relative to the IMU, so that data from both components may be properly correlated. Additional details are now provided by way of discussion of the included drawings.

FIG. 1 depicts an example medical video system 100 that includes a video laryngoscope (VL) 102, which may serve as a control device for the steerable endoscope 106. The VL 102 is capable of connecting to, and providing steering control of, the endoscope 106, through a detachable cartridge 104. The endoscope distal end 116 includes a steerable tip 118 and accessories 119, which may be used during operation of the endoscope 106, such as during an intubation, which may be performed using the VL 102 and endoscope 106. For example, the accessories 119 may include a camera system (e.g., a video camera, lights, etc.) that captures image data (e.g., video images of the airway) during use. The accessories 119 may also include sensors, such as an accelerometer or IMU, which provides measurement data associated with the acceleration, angular velocity, position, and/or other variables associated with the position/orientation/movement of the steerable tip 118. In some examples, the accessories 119 may further include one or more instrument ports, such as a port for a working channel (depicted in FIGS. 3A-C).

The steerable tip 118 is connected to a drive system 122 by one or more pairs of pull wires (not depicted), which are routed along the interior of the endoscope 106 from the drive system 122 to the endoscope distal end 116.

The endoscope proximal end 114 also includes an electrical interface 123A, through which the endoscope 106 may receive electrical power and may transmit/receive signals to/from the VL 102. For example, the electrical interface 123A may provide power and/or steering control signals from the VL 102 to the drive system 122 for controlling the movement of the endoscope steerable tip 118. The electrical interface 123A also provides a source of input power for operating the accessories 119 (such as the camera system, sensors, etc.), and/or other sensors or electronic elements included within the endoscope 106.

Further, the electrical interface 123A provides a data path for transmitting sensor data, video images, and/or other types of data from the endoscope 106 to the VL 102. For instance, video image data captured by the endoscope camera system may be transmitted to the VL 102 via the electrical interface 123A. In some examples, signals or data (such as clock, enable, timing, and/or other signals) may be transmitted/received through the electrical interface 123A in order to enable or configure operation of the endoscope 106.

The electrical interface 123A may include a plurality of electrical contacts, such as conductive pads, receptacles, pins, balls, ports, and/or other type of electrical contacts that are connected to elements of the endoscope 106 by a plurality of conductors routed within the interior of the endoscope 106. The conductors (not depicted) may include one or more electrical wires, flexible printed circuits (FPCs), electrical cables, and/or other types of electrical conductors suitable for distributing power and establishing signal connection between the electrical interface 123A and elements of the endoscope 106. For instance, wires may be routed along the internal length of the endoscope 106 between the electrical interface 123A and a flexible printed circuit board located in the steerable tip 118 (depicted in FIGS. 2A-B and 3A-C). The electrical wires provide power and signal connectivity to the circuit board.

In addition, the endoscope 106 may include an access port 126 that provides access to the working channel. As described above, in some examples, a topical agent may be delivered to the airway during intubation through the working channel, via the access port 126. For instance, a syringe, catheter, or other type of medical device may be inserted through the access port 126 and into the working channel for delivery of the topicalizing agent, which is dispensed into the airway at an exit port provided with the accessories 119. In other examples, the access port 126 and working channel may be used for other purposes, such as the application of suction, the insertion of tissue-sampling instruments, and/or for other purposes.

In the example video system 100, the access port 126 is located at the proximal tip of the endoscope 106, where the working channel may be routed around or through the drive system 122 and electrical interface 123A. In other examples, the access port 126 may be located elsewhere in or near the endoscope proximal end 114, or elsewhere along the length of the endoscope 106. For instance, the access port 126 may be located distally from the drive system 122.

To connect the endoscope 106 to the VL 102, the endoscope proximal end 114 is connected to the detachable cartridge 104, which serves as an electrical and/or mechanical interface between the VL 102 and endoscope 106. In other examples, the endoscope 106 may connect to the VL 102 by another type of cartridge 104, or the endoscope 106 may connect directly to the VL 102, such as at a connection port included with the VL 102.

The cartridge 104 further includes an electrical interface 123B on the cartridge rear surface 124, for making electrical connection with the VL 102. Within the cartridge 104, the electrical interface 123B is connected to the electrical interface on the cartridge front surface 125, such as by wiring, pins, printed circuit board (PCB), flex, and/or other type of electrical connection.

The VL 102 includes a display 112, a handle 108, and a blade or extension 110, which includes a camera 111 positioned at the distal end of the blade or extension 110. The VL 102 may include additional functions or features typically associated with a video laryngoscope, such as a power source (e.g., a battery), processor, memory, and other electronic components.

In an example, the VL 102 receives data (such as video images and sensor data) from the steerable endoscope 106 through the cartridge 104 and displays the received data on the display 112. The display may be capable of displaying images from multiple cameras simultaneously, such as images from the VL camera 111 and the endoscope camera, such as by split screen, picture-in-picture, or other display methods. The display 112 may be any of a variety of display technologies, such as LCD, LED, OLED, or other display technology. In examples, the display 112 may be a touch-sensitive display (e.g., a capacitive touch-sensitive display) that allows the user to provide steering input through the display 112. Elements of the VL 102 may translate the steering inputs to corresponding motor outputs for articulating the endoscope steerable tip 118.

Additionally or alternatively, the endoscope 106 may be connected to other types of control devices capable of receiving the endoscope proximal end and establishing mechanical and/or electrical connection with the endoscope 106. In examples, the control device may provide steering control of the endoscope steerable tip 118 and may receive image data from the endoscope 106.

Figure 2B:
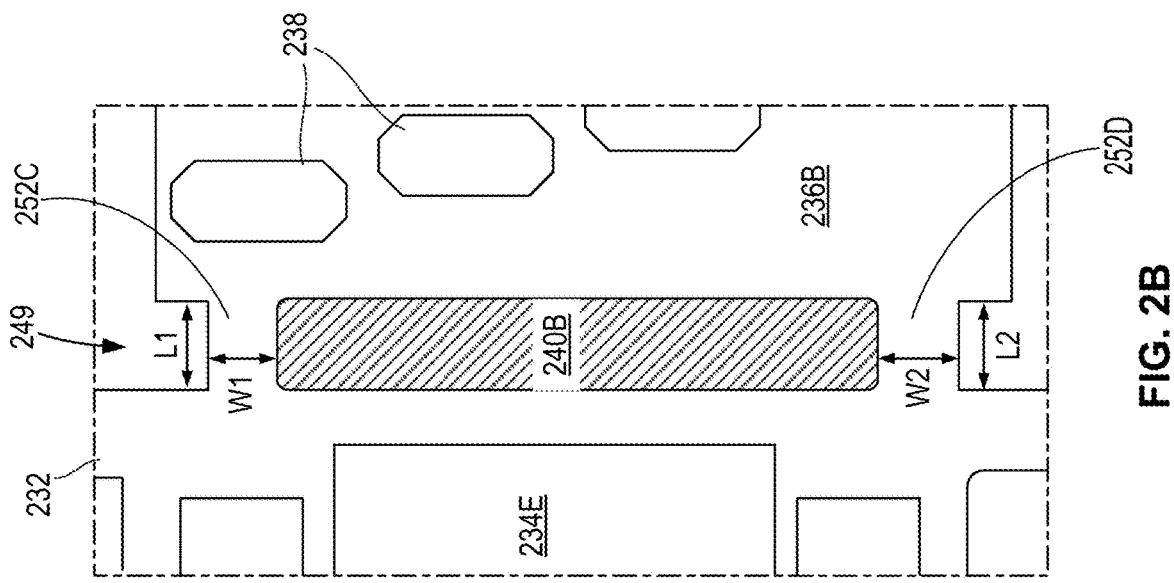
FIGS. 2A-2B depict an example flexible printed circuit board.
Figure 2A:
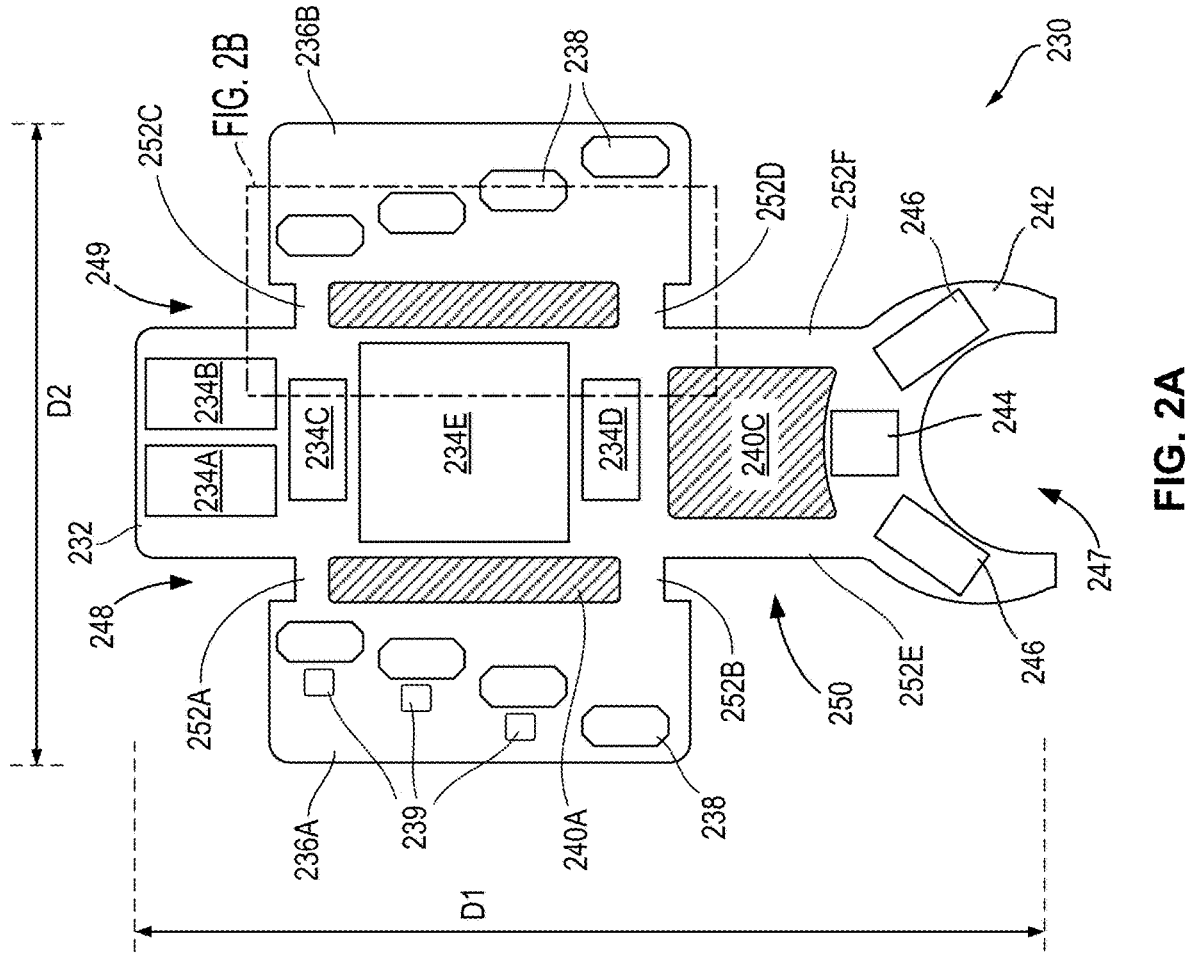

FIG. 2A depicts a top view of an example flexible, foldable printed circuit board (PCB) 230 that may be included in the steerable tip of an endoscope (e.g., steerable tip 118). FIG. 2B depicts an enhanced top view of a bendable or flexible region 249 of the flexible PCB 230. The flexible PCB 230 is shown in a substantially 2D configuration (e.g., flat or planar), such as prior to being installed in the endoscope steerable tip. The PCB 230 includes a sensor segment or section 232, a first wiring segment or section 236A, a second wiring segment or section 236B, and a camera system segment or section 242. Each of the segments or sections are positioned on, or defined, by portions of the PCB 230 that are folded relative to another, such that the components on one section are positioned on different planes than other sections when the PCB 230 is folded. For instance, in the example depicted each of the different segments planar and the arms connecting the different planar segments may be bent to effectively fold the PCB into its 3D configuration. In the example depicted, the camera system segment 242 is positioned distally from the sensor segment 232. The first wiring segment 236A is positioned on a first lateral side of the sensor segment 232, and the second wiring segment 236B is positioned on a second lateral side of the sensor segment 232. Electrical components are represented as 2D shapes but are depicted as 3D shapes in FIGS. 3A-C.

The sensor section 232 includes a plurality of sensor components 234A-E, such as an IMU 234E, one or more passive support components 234A-D (e.g., capacitors, resistors, etc.), and/or other active or passive components. In examples, the sensor section 232 may include one or more active and/or passive components on the backside (or underside) of the sensor section 232. As described above, rather than an IMU 234E, in some examples the sensor section 232 may include an accelerometer or other type of component capable of sensing position, orientation, acceleration, angular velocity, and/or other variables associated with position and/or motion.

The camera system section 242 includes a camera 244 and a pair of LEDs 246, and in some examples may include additional active or passive components. The camera 244 may be a type of image sensor that outputs image data in a digital format. In other examples, the camera 244 may be another type of image sensor that outputs image data in digital or analog format. The camera system section 242 may include greater or fewer LEDs 246 than depicted, and the LEDs 246 may be arranged in different positions and/or locations in the camera system section 242. The LEDs 246 may be arranged to provide suitable transmission of light into a cavity of a patient when the PCB 230 is installed in the endoscope steerable tip. In some examples, rather than LEDs 246, the camera system section 242 may include other types of light-emitting elements, such as lamps, bulbs, or other types of light-emitting elements. Similar to the sensor section 232, the camera system section 242 may include one or more active and/or passive components on the backside of the camera system section 242 (not depicted).

Further, the camera system section 242 may be shaped to accommodate a portion of a working channel that passes in the vicinity of the camera system section 242. For example, as depicted in FIG. 2A, the camera system section 242 includes an opening 247 that is designed to accommodate the shape of a circular working channel, when the flexible PCB 230 is installed in an endoscope steerable tip. Other shapes of the opening 247 may be used for different types or working channel shapes of the endoscope. In the example depicted, the LEDs 246 are positioned symmetrically about the camera 244 and also positioned on either side of a center of the opening 247.

The wiring sections 236A-B include a plurality of wire pads 238 for attaching wires or other types of electrical conductors that electrically connect elements of the PCB 230 to one or more elements in the proximal end of the endoscope (e.g., electrical interface 123A). The wires (not depicted) distribute electrical power to the PCB 230 and allow components of the PCB 230 to transmit and/or receive electrical signals, via the wire pads 238. In some examples, the wires are in the form of a cable that is soldered to, or otherwise connected to the wire pads 238. A cable connector may be included on the PCB 230 that mates with a corresponding cable connector of the cable. Such a cable connector may be as an alternative, or in addition to, the wire pads 238.

Wire pads 238 associated with power supply connections may support the distribution of a single power supply domain or may support the distribution of two or more power supply domains. For example, components associated with the sensor section 232 (e.g., the IMU 234E) may operate from a first power supply domain (e.g., 3.3 Volts), and components associated with the camera system section 242 (e.g., the camera 244) may operate from a second power supply domain (e.g., 3.0 Volts). In other examples, components of both the sensor section 232 and camera system section 242 may operate from a single power supply domain. Similarly, wire pads 238 may support one or more electrical grounds associated with one or more of the provided power supply domains. For instance, the PCB 230 may include a single electrical ground, or may utilize a split-ground configuration, in which different electrical circuits utilize different electrical grounds (e.g., an analog ground and a digital ground).

In addition, the wire pads 238 may support a variety of signals associated with the operation of the IMU 234E, camera system, and other circuits and/or components. For example, signals transmitted from, or received by, circuits and/or components of the PCB 230 may include one or more clock, enable, data, and/or other types of signals. In examples, sensor data may be transmitted from the IMU 234E and video data may be transmitted from the camera 244 via the wire pads 238. The transmitted data may be in analog or digital form, and the data may be transmitted as a single-ended or differential signal.

In some examples, the first wiring section 236A may include wire pads 238 that support the operation of components in one section of the board or one circuit or set of circuits, and the second wiring section 236B may support the operation of components in the remaining sections or circuits. For instance, the first wiring section 236A may include wire pads 238 that provide power and transmit/receive signals associated with the operation of the camera system. The second wiring section 236B may include wire pads 238 that provide power and transmit/receive signals associated with the operation of the IMU 234E. In other examples, the wire pads 238 in the wiring sections 236A-B may be configured to support operation of any circuit and/or component in any section of the flexible PCB 230.

As depicted in FIG. 2A, the wire pads 238 may be surface mount pads that include one or more substantially flat layers of conductive material adhered to the surface of the wiring sections 236A-B. Electrical wires or other types of conductors may be attached to the wire pads 238 by any of a variety of forms of soldering, conductive bonding, or other method of attachment. In some examples, the wire pads 238 may be implemented as one or more through-hole connections, where the wiring sections 236A-B may include a series of holes through which the wires or conductors may be inserted and soldered.

The electrical wires or other type of conductor may be attached to the wire pads 238 while the flexible PCB 230 is in the 2D configuration. In other examples, the wires may be attached at a later step in the assembly, such when the PCB 230 is reconfigured into a 3D configuration (described below). In such examples, to facilitate attachment of the wires when the PCB 230 is in the 3D configuration, solder may be applied to the wire pads 238 while the PCB 230 is in the 2D configuration. During a later assembly step, the solder may be reheated (e.g., as part of a reflow solder process) and the wires attached.

Additionally or alternatively, in lieu of surface mount pads, one or more of the wire pads 238 may be implemented as one or more connectors. For instance, the wiring sections 236A-B may include one or more sockets, receptacles, plugs, pins, and/or any of a wide variety of suitable connectors. As one example, the wires may be implemented as one or more coaxial cables, and the wiring sections 236A-B may include connectors for attaching the coaxial cables. As another example, the wires may be implemented as an FPC, and the wiring sections 236A-B may each include board-to-board connectors for receiving an FPC. In other examples, the wiring sections 236A-B may include other types of connectors for receiving other types of cabling or wiring arrangements.

One or both of the wiring sections 236A-B may also include one or more accessory pads 239 which, in some examples, are populated with support components. For example, the accessory pads 239 may be populated with capacitors which support the provision of electrical power, provide a level of filtering for conducted signals, or provide some other function. In another example, the accessory pads 239 may be populated with one or more resistors arranged to divide or otherwise reduce the provided power supply voltage for use by components of the flexible PCB 230. In some examples, the accessory pads 239 may include a pair of surface mount pads for each support component. In other examples (such as depicted in FIG. 2A), each of the accessory pads 239 may include a single pad and the support component may be installed between each accessory pad 239 and a corresponding wire pad 238.

In examples, the components described above may be attached to the PCB 230 in any of a variety of possible arrangements. Electrical components described above may be arranged on the flexible PCB 230 as depicted in FIGS. 2A-B. In other examples, the components may be arranged on the PCB 230 according to a different layout. For example, one or more of the sensor components 234A-E may be included with the wiring sections 236A-B, rather than being placed in the sensor section 232. In further examples, the PCB 230 may be configured in a different shape, with greater or fewer sections in which components may be arranged.

Additionally, the position and orientation of the IMU 234E and camera 244 on the PCB 230 may be selected so that the data from both components may appropriately correlated. For example, the IMU 234E may be attached to the PCB 230 so that the motion-sensitive axes of the IMU 234E are in a known orientation relative to the viewing axis of the camera 244, when the PCB 230 is installed in a steerable tip. Additional discussion is provided below with respect to FIGS. 3A-C.

In some examples, electrical components associated with the PCB 230, such as the sensor components 234A-E, camera 244, LEDs 246, components attached to accessory pads 239, and other components, may be attached to the PCB 230 by a soldering method. In examples, soldering methods may include reflow soldering, wave soldering, manual soldering, and/or other soldering methods. In other examples, the components may be attached to the PCB 230 by other methods, such as by conductive adhesive (e.g., conductive epoxy) or other method.

In examples, the PCB 230 may be part of a PCB panel or sheet (not depicted) that includes a plurality of identical PCBs 230 that are cut or otherwise removed from the panel to produce a single PCBs 230. In some examples, electrical components may be attached to each of PCBs 230 of the panel prior removal of each PCB 230 from the panel. For instance, components may be placed on all PCBs 230 of the panel (e.g., by an automated pick-and-place method), and the panel may be reflow soldered to attach the components to the PCBs 230. One or more of the PCBs 230 may then be cut from the panel in preparation for installation in an endoscope steerable tip. In other examples, the PCBs 230 may be removed from the panel prior to placement and soldering of the components. Similarly, electrical wires (or other type of conductor) may be attached to wire pads 238 of each PCB prior to removing each PCB from the panel, or the wires may be attached following depanelization of the PCB 230. In examples, where wires are attached to the flexible PCB 230 at a later step in the assembly, such as during installation of the PCB 230 in a steerable tip, solder may be applied to the wire pads 238 in preparation for wire attachment.

The flexible PCB 230 may comprise a flexible substrate, such as polyimide (PI) or other type of flexible circuit board material. In one example, the PCB 230 may include two routing layers (e.g., a two-layer board) and be fabricated using PI. In other examples, the PCB 230 may include three or more routing layers. The routing layers include circuit traces (not depicted) that electrically connecting components of the PCB to form electrical circuits. The routing layers may also include one or more plane layers, such as power and/or ground planes, which consist of larger areas of copper or other conductive material of the PCB 230.

The combination of routing layers, substrate materials (e.g., PI), and other materials used to fabricate the flexible PCB 230 may result in a PCB thickness of about 0.1 mm. In some examples, the PCB thickness may be between 0.1 mm and 0.2 mm. In other examples, the PCB thickness may be between 0.05 mm and 0.1 mm. The PCB 230 may be further sized to allow installation of the PCB 230 in an endoscope steerable tip. In some examples, in the 2D configuration, the PCB 230 may have a first dimension D1 of 10 mm and a second dimension D2 of 7 mm. For instance, the ratio of D1 to D2 may be between 2:1 and 3:2. In other examples, the dimensions D1 and D2 may be greater or smaller.

Figure 3C:
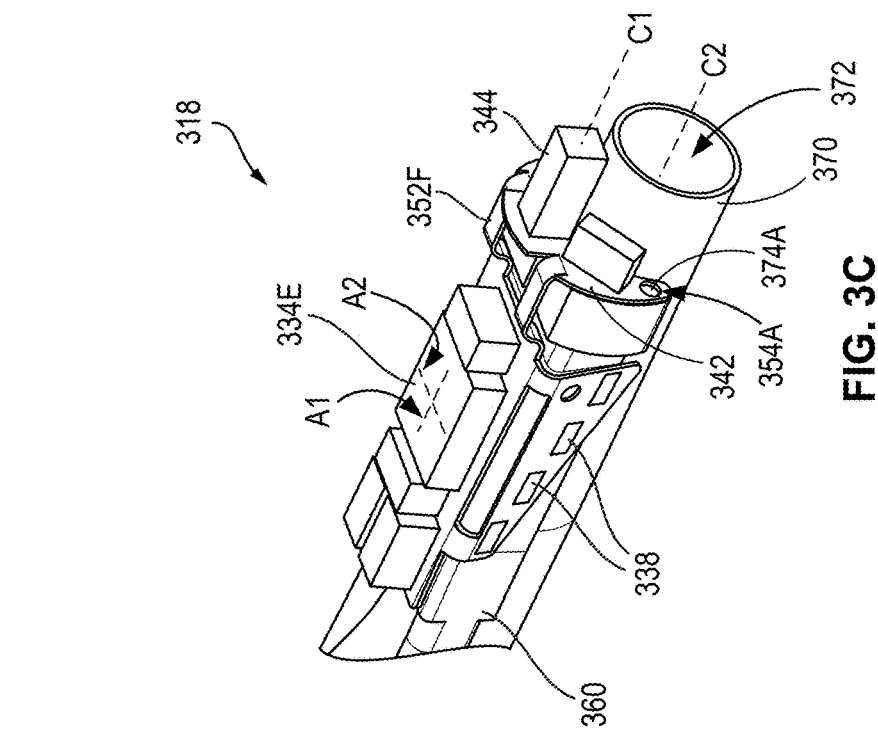
FIGS. 3A-3C depicts views of an example endoscope steerable tip.
Figure 3A:
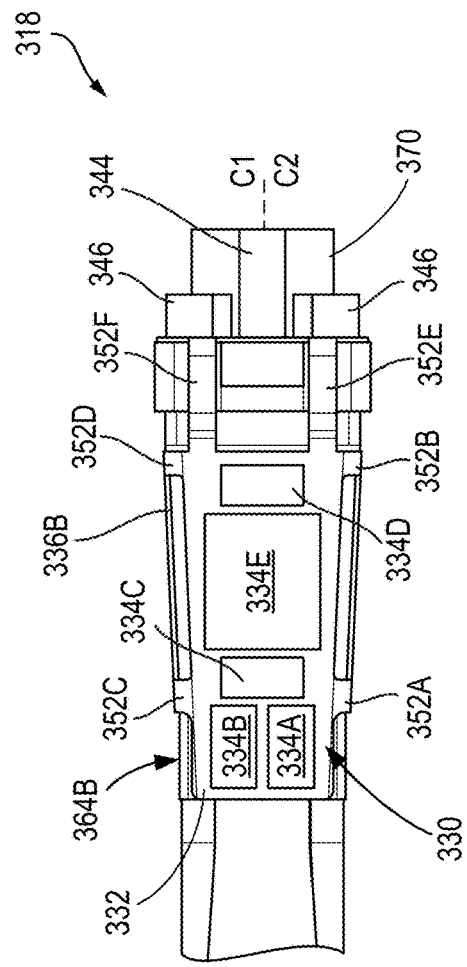
Figure 3B:
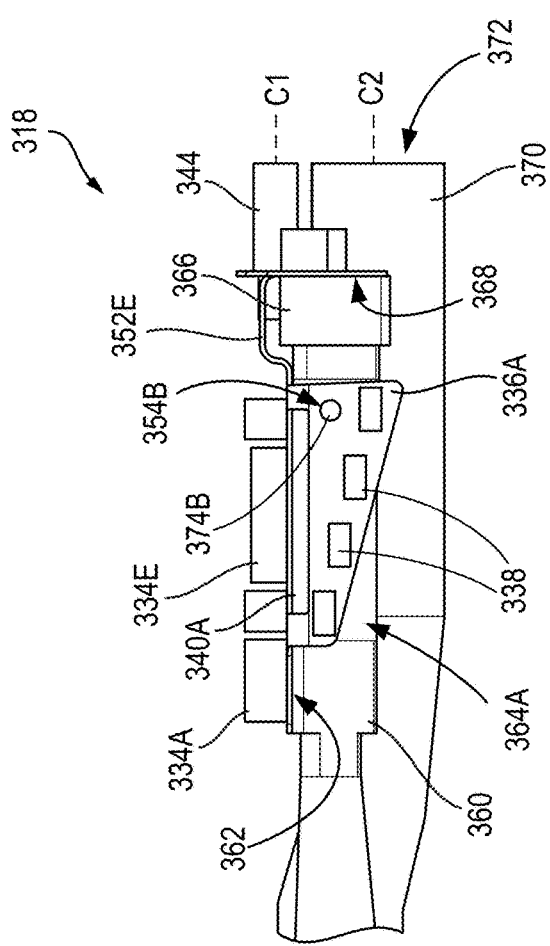

The flexible PCB 230 further includes one or more flexible regions 248-50 that may include flexible, bendable extensions or arms 252A-F and apertures 240A-C. This arrangement is designed to allow the PCB 230 to bend or flex more easily in the flexible regions 248-50. Accordingly, when the board 230 is installed in the endoscope steerable tip, the PCB 230 may be reconfigured from a substantially 2D configuration (e.g., flat or planar) to a substantially 3D configuration, such as by applying force to one or more sections of the board to cause bending in the flexible regions 248-50. FIG. 3A-C depict one example of a 3D configuration, where the PCB 230 is affixed to a portion of an example steerable tip.

The first flexible and/or bendable region 248 includes a first aperture 240A and flexible arms 252A-B that connect the sensor section 232 to the wiring section 236A. Accordingly, the sensor section 232 is partially separated from the wiring section 236A by the first aperture 240A. Similarly, the second flexible and/or bendable region 249 includes a second aperture 240B and flexible arms 252C-D that connect the sensor section 232 to the wiring section 236B. Bending force applied to the wiring sections 236A-B and/or the sensor section 232 causes the flexible arms 252A-D to bend in the flexible regions 248-49 so that the wiring sections 236A-B may rotate relative to the sensor section 232. The third flexible and/or bendable region 250 includes a third aperture 240C and flexible arms 252E-F that connect the sensor section 232 to the camera system section 242. Thus, the sensor section 232 is partially separated from the camera system section 242 by the third aperture 240C. Bending force applied to the camera system section 242 and/or sensor section 232 causes the flexible arms 252E-F to bend in the flexible region 250 so that the camera system section 242 may rotate relative to the sensor section 232. Accordingly, during installation of the flexible PCB 230 in an endoscope steerable tip, the wiring sections 236A-B may be arranged into a position that supports installation, and the camera system section 242 may be arranged to orient the camera 244 and LEDs 246 towards the distal end of the steerable tip, to provide a view of a patient cavity.

The flexible arms 252A-F are continuous with, and part of, the PCB 230 and may include one or more circuit traces and/or planes that electrically connect elements of the wiring sections 236A-B, sensor 232, and camera system section 242. In some examples, one or more of the flexible arms 252A-F may not include circuit traces or planes.

To facilitate further description of the flexible regions 248-50, a magnified view of the second flexible region 249 is depicted in FIG. 2B. The flexibility of the flexible region 249 may be at least partially determined by dimensions of the flexible arms 252C-D, which may act as a hinge or pivot between the sensor section 232 and wiring section 236B. The flexible arm 252C has a width W1 and length L1, and the flexible arm 252D has a width W2 and length L2. In the example depicted in FIG. 2B, the flexible arms 252C-D are spaced apart such that the first aperture 240B is formed between the flexible arms 252C-D, the sensor section 232, and the wiring section 236B. Flexibles arms 252C-D that are relatively wider (e.g., greater widths W1, W2) decrease the size of the aperture 240B and decrease the flexibility of the flexible region 249. Conversely, flexible arms 252C-D that are relatively narrower (e.g., smaller widths W1, W2) increase the size of the aperture 240B and increase flexibility. In a similar fashion, flexible arms 252C-D that are relatively longer (e.g., greater lengths L1, L2) increase the size of the aperture 240B, and increase flexibility, while flexible arms 252C-D that are relatively shorter (e.g., shorter lengths L1, L2) decrease the size of the aperture 240B and decrease flexibility of the flexible region 249.

In the example depicted in FIGS. 2A-B, the second flexible region 249 includes two flexible arms 252C-D and a single aperture 240B. In other examples, rather than two flexible arms 252C-D, the flexible region 249 may include a single flexible arm connecting the sensor section 232 and the wiring section 236B. In such an example, rather than an aperture 240B, the flexible region 249 may include openings in the PCB 230 on either side of the single flexible arm, which may increase the flexibility of the PCB 230 in the flexible region 249. In further examples, the flexible region 249 may include three or more flexible arms connecting the sensor section 232 and the wiring section 236B, and two or more apertures may be formed. In these examples, relatively wider and shorter flexible arms may decrease flexibility, and relatively narrower and longer flexible arms may increase flexibility of the flexible region 249, as described above.

In still other examples, the flexible arms 252C-D may have different dimensions. For example, the widths W1 and W2 may be different, and the lengths L1 and L2 may be different for the two flexible arms 252C-D. In some examples, one or both of the flexible arms 252C-D may be curved and/or may follow a defined shape or path, such as to facilitate installation of the PCB 230 in an endoscope steerable tip. For instance, one or both of the flexible arms 252C-D may be curved to avoid a feature or element of the endoscope steerable tip.

In addition to flexibility, the widths W1, W2 and lengths L1, L2 may be based on the dimensions of the sensor section 232, dimensions of the wiring section 236B, dimensions of elements or portions of the endoscope steerable tip, mounting considerations, and/or other factors that may affect installation of the PCB 230 in an endoscope steerable tip.

Similarly, the width, length, number, placement, shape, and/or other aspects of flexible arms 252A-B and 252E-F may be designed/selected as described above to achieve a desired flexibility or to otherwise facilitate installation of the flexible PCB 230 in an endoscope steerable tip. In examples, the flexible arms 252A-F may be designed differently than, and independently from, one another. For instance, while the flexible regions 248-49 and wiring sections 236A-B are depicted in FIGS. 2A-B as being substantially symmetric, in other examples, the flexible regions 248-49 and/or wiring sections 236A-B may be designed substantially differently.

Flexibility of the flexible regions 248-50 may also be based on the composition of the PCB 230. For example, the number of routing layers, the amount of copper or other conductive material on each routing layer (e.g., from circuit traces, ground planes, etc.), the type of substrate material (e.g., PI), amount of substrate material (e.g., thickness), properties of other materials used to fabricate the PCB 230, and/or other factors may contribute to the flexibility of the flexible regions 248-250.

In some examples, properties of the substrate material, the thickness of the PCB 230, the amount of copper or other conductive material in the flexible arms 252A-F, and/or other factors may allow the flexible arms 252A-F to maintain a bend after bending force is removed. For instance, bending force may be applied to one or both of the wiring sections 236A-B to cause the wiring sections 236A-B to assume a 90-degree orientation relative to the sensor section 232. The applied bending force causes the copper of the circuit traces to form a 90-degree elbow in the flexible regions 248-249 (e.g., see FIGS. 3A-C). The substrate material may be sufficiently compliant that when the bending force is removed, the 90-degree elbow formed in the copper may be maintained. The flexible arms 252E-F may be similarly capable of maintaining a bend following removal of a bending force. In other examples, the flexible arms 252A-F may not be capable of maintaining a bend, such as when the substrate material exhibits a level of elasticity that applies a restoring force to the flexible arms 252A-F when the bending force is removed.

Applying force to one or more portions of the PCB 230 to cause bending of the PCB 230 in the flexible regions may result in the application of mechanical stress and/or strain to portions of the PCB 230 that include electrical components (e.g., the sensor section 232 and camera system section 242). Further, articulation of the endoscope steerable tip and general handling of the endoscope during use (or other factors), may also result in the application of stress and/or strain to portions of the PCB 230 that include electrical components. The application of stress and/or strain to component-bearing portions of the flexible PCB 230 may increase the possibility that components become detached from the PCB 230. To decrease the risk of component detachment from the PCB 230, adhesive material may be applied between the surface of the PCB 230 and one or more of the components, such as underneath and/or around the sides of the components. The application of adhesive material beneath and/or around the sides of a component to help adhere the component to the PCB 230 may be referred to as an underfill. The adhesive/underfill material may include a type of epoxy, plastic resin, or other type of suitable adhesive material that increases adhesion of the components to the PCB 230.

In one example, underfill may be applied to the camera 244 and the underfill material may be tinted or may include dark pigments to improve optical performance. For instance, the tinted underfill may prevent unwanted parasitic or scattered light from entering portions of the camera 244 and affecting image quality. In examples where underfill is applied to one or more components of the PCB 230, the underfill may be applied as the PCB 230 is populated with components, such as before the soldering process. In other examples, underfill, or other types of adhesive material, may be applied to the components and/or PCB 230 following the soldering process, but prior to installation of the PCB in the steerable tip, such as when the PCB 230 is in the 2D configuration.

FIGS. 3A-C depict views of portions of an example endoscope steerable tip 318 with an example flexible PCB 330 installed. The portions of the steerable tip 318 depicted in FIGS. 3A-C do not include bendable regions of the steerable tip 318 that articulate in response to applied steering forces. Rather, the depicted portions include rigid or semi-rigid portions of the steerable tip 318 that are located distally from the bendable regions, where the PCB 330 may experience reduced mechanical stress and/or strain during use. The steerable tip 318 may be similar to or the same as steerable tip 118 depicted in FIG. 1. The flexible PCB 330 may be similar to, or the same as the example flexible PCB 230 depicted in FIGS. 2A-B, and may include the same or similar elements, such as an IMU 334E, camera 344, and LEDs 346, among other elements.

During installation, the PCB 330 is reconfigured from the substantially 2D coplanar configuration depicted in FIGS. 2A-B, to a 3D configuration. The PCB 330 is attached to a mounting scaffold 360 that is further attached to a portion of a guide tube 370, which forms the outer wall of a working channel 372. The mounting scaffold 360 includes side surfaces 364A-B for attaching wiring sections 336A-B. Force is applied to the wiring sections 336A-B causing the flexible arms 352A-D to bend, causing a surface of the wiring sections 336A-B to become parallel with, and contact, the side surfaces 364A-B (while still remaining partially separated from the sensor segment by the aperture 340A). The mounting scaffold 360 further includes a camera mount 366 for attaching the camera system section 342. Force is applied to the camera system section 342 causing the flexible arms 352E-F to bend, causing a surface the camera system section 342 to become parallel with, and contact, a front surface 368 of the camera mount 366. The mounting scaffold 360 also includes a top surface 362, onto which the sensor section 332 may be attached.

When the foldable PCB is in the 3D configuration, the planar segments of the PCB 330 may extend along different planes that are substantially orthogonal to one another. For example, the sensor segment 232 extends along a first plane (e.g., a top plane), and the camera system segment 342 extends along a second plane (e.g., a distal plane) that is substantially orthogonal to the first plane. The first wiring segment 336A extends along a third plane (e.g., a lateral plane) that is substantially orthogonal to the first plane and the second plane. The second wiring segment 336B extends along a fourth plane that is substantially parallel with the third plane but on a different lateral side of the sensor segment 332.

To attach the PCB 330 to the mounting scaffold 360, any of a variety of attachment methods be used. In some examples, the PCB 330 may be attached to the mounting scaffold 360 using one or more types of adhesives. For instance, a type of epoxy may be used to attach portions of the PCB 330 to one or more of the top surface 362, side surfaces 364A-B, and/or front surface 368. As an example, epoxy may be applied between the top surface 362 and sensor section 332, between the side surfaces 364A-B and the wiring sections 336A-B, and/or between the front surface 368 and camera system section 342. Epoxy may be applied to other portions of the PCB 330 and mounting scaffold 360 in order to attach the PCB 330.

In other examples, other forms of adhesives, such as pressure sensitive adhesive (PSA), ultraviolet (UV) glue, and/or other forms of adhesive, may be used to attach one or more portions of the PCB 330 to the mounting scaffold 360. In still other examples, the PCB 330 may be attached to the mounting scaffold 360 via mechanical methods, such as by bolts, retention tabs or guides, and/or other types of mechanical methods. The PCB 330 may be attached to the mounting scaffold 360 by combination of two or more of the above methods, and/or by any of a variety of other suitable methods.

The method of attaching portions of the PCB 330 to the mounting scaffold 360 is suitable for withstanding elastic or restorative forces applied by the substrate material of the PCB 330. As described above, properties of the PCB 330 (e.g., PCB thickness, substrate material, etc.) may result in a PCB 330 that is flexible, but that exhibits a level of elasticity. The epoxy, PSA, or other method of attaching portions of the PCB 330 to the mounting scaffold 360 provides sufficient adhesive force to portions of the PCB 330 to retain those portions to the corresponding surfaces of the mounting scaffold 360.

In addition, during use of the endoscope, such as during articulation of the steerable tip 318, portions of the PCB 330, mounting scaffold 360, and/or other portions or elements of the steerable tip 318 may experience mechanical stress and/or strain. The method of attaching portions of the PCB 330 to the mounting scaffold 360 provides sufficient adhesive force to portions of the PCB 330 to retain those portions to the corresponding surfaces of the mounting scaffold 360, during use of the endoscope.

When the PCB 330 is attached to the mounting scaffold 360, one or more of the flexible arms 352A-F may be arranged or configured to such as to provide strain relief between different sections or portions of the PCB 330 and/or to allow the flexible arms 352A-F to bend or deform to follow the shape of the mounting scaffold 360. For example, as depicted in FIGS. 3B-C, the flexible arms 352E-F, which connect the camera system section 342 to the sensor section 332, are arranged to provide clearance between the flexible arms 352E-F and the camera mount 366, a portion of which protrudes from the top surface 362. In other examples, the flexible arms 352A-F may be positioned or configured in other arrangements. In some examples, the flexible arms 352A-F, or portions of the flexible arms 352A-F, may be bent, formed, molded, shaped, or otherwise manipulated to cause the flexible arms 352A-F to maintain a particular contour or shape (e.g., the contour depicted in FIG. 3B).

The mounting scaffold 360 may include one or more mounting features that may aid installation of the PCB 330 onto the mounting scaffold 360. The mounting features may also be used for aligning sections of the PCB 330 with one another and/or for aligning the PCB 330 (or portions or elements of the PCB 330) with portions of the endoscope steerable tip 318. For example, the mounting scaffold 360 may include one or more front mounting posts 374A (one of which is visible in FIG. 3C) for mounting the camera system section 342 to the front surface 368 of the camera mount 366. The camera system section 342 may include one or more mounting apertures 354A that receive the front mounting posts 374A. When the camera system section 342 is attached to the front surface 368, with front mounting posts 374A received in the mounting apertures 354, the mounting posts 374A may cause the camera system section 342 to be positioned and/or oriented such that a center axis C1 of camera 344 is substantially aligned with (e.g., parallel to) the center axis C2 of the working channel lumen 372. Thus, the front mounting posts 374A help ensure that the camera 344 is oriented for providing a suitable view of the patient cavity, and that light emitted by the LEDs 346 is effectively transmitted into the patient cavity.

Additionally or alternatively, the mounting scaffold 360 may include one or more side mounting posts 374B associated with the side surfaces 364A-B (only one side mounting post 374B is visible in FIGS. 3B-C). The wiring sections 336A-B may include mounting apertures 354B that receive the side mounting posts 374B when the wiring sections 336A-B are attached to the side surfaces 364A-B. In some examples, the combination of the side mounting posts 374B and front mounting posts 374A may orient the motion-sensitive axes of the IMU 334E relative to the center axis C1 of the camera 344. For example, the IMU 334E may include a first motion-sensitive axis A1 and a second motion-sensitive axis A2 that is perpendicular to the first axis A1. The first and second axes A1-2 may provide motion data associated with movement of the steerable tip 318 in 2D movement plane. In the example depicted in FIG. 3C, the arrangement of the mounting posts 374A-B may cause the axis A1 to be substantially aligned (e.g., parallel) with the center axis C1 of the camera 344, and the axis A2 to be substantially perpendicular to the center axis C1. In other examples, the mounting posts 374A-B may provide another relative orientation between the motion-sensitive axes A1-2 and the center axis C1 of the camera 344. During articulation of the steerable tip 318, 2D motion data provided by the IMU 334E may be correlated with changes in the viewpoint of the camera 344.

In further examples, the IMU 334E may include a third motion-sensitive axis (not depicted) that is substantially perpendicular to the first and second axes A1-2, and may provide motion data that, when combined with the data for the first and second axes A1-2, is associated with 3D movement of the steerable tip 318. Thus, during articulation of the endoscope steerable tip 318, the 3D motion detected by IMU 334E may be properly correlated with changes in the viewpoint of the camera 344.

Additionally or alternatively, the mounting scaffold 360 may include one or more mounting posts (not depicted) associated with the top surface 362 of the mounting scaffold 360. These mounting posts may be received by apertures (not depicted) associated with the sensor section 332 and may be used to provide alignment of the sensor section 332, such as described above, or may be used for another purpose.

In some examples, mounting posts 374A-B may be implemented as other types of alignment features associated with the mounting scaffold 360. For example, the mounting posts 374A-B may be tabs, guides, edges, ridges, lips, and/or any of a variety of suitable alignment features. The PCB 330 may include corresponding features that receive the alignment features of the mounting scaffold 360.

As depicted in FIGS. 3A-C, the flexible PCB 330 is mounted directly to the mounting scaffold 360. In some examples, a stiffener may be included between one or more portions/sections of the PCB 330 and a corresponding mounting surface of the mounting scaffold 360. For instance, a stiffener may be included between the sensor section 332 and the top surface 362 of the mounting scaffold 360. The stiffener may help reinforce the sensor section 332, to reduce the possibility of components 334A-E becoming detached from the sensor section 332 during use, such as may be caused by mechanical stress and/or strain on the PCB 330 during use. In examples where the stiffener is included, the stiffener may be attached to the mounting scaffold 360 and/or to portions of the PCB 330 via the attachment methods described above, such as by adhesive, PSA, and/or other methods. The stiffener may include apertures and/or alignment features that help align portions of the PCB 330 to one another, and/or to the mounting scaffold 360, guide tube 370, and/or other portions of the endoscope steerable tip 318.

As described above, in some examples, wires (not depicted) may be attached to the wire pads 338 of the flexible PCB 330 prior to attachment of the PCB 330 to the mounting scaffold 360. In other examples, wires may be attached to the wire pads 338 following attachment of the PCB 330 to the mounting scaffold 360. In examples, where the wiring sections 336A-B include connectors or other type element for connecting electrical conductors, the conductors may be plugged into or otherwise connected to the wiring sections 336A-B either before or after the PCB 330 is attached to the mounting scaffold 360.

Figure 4:
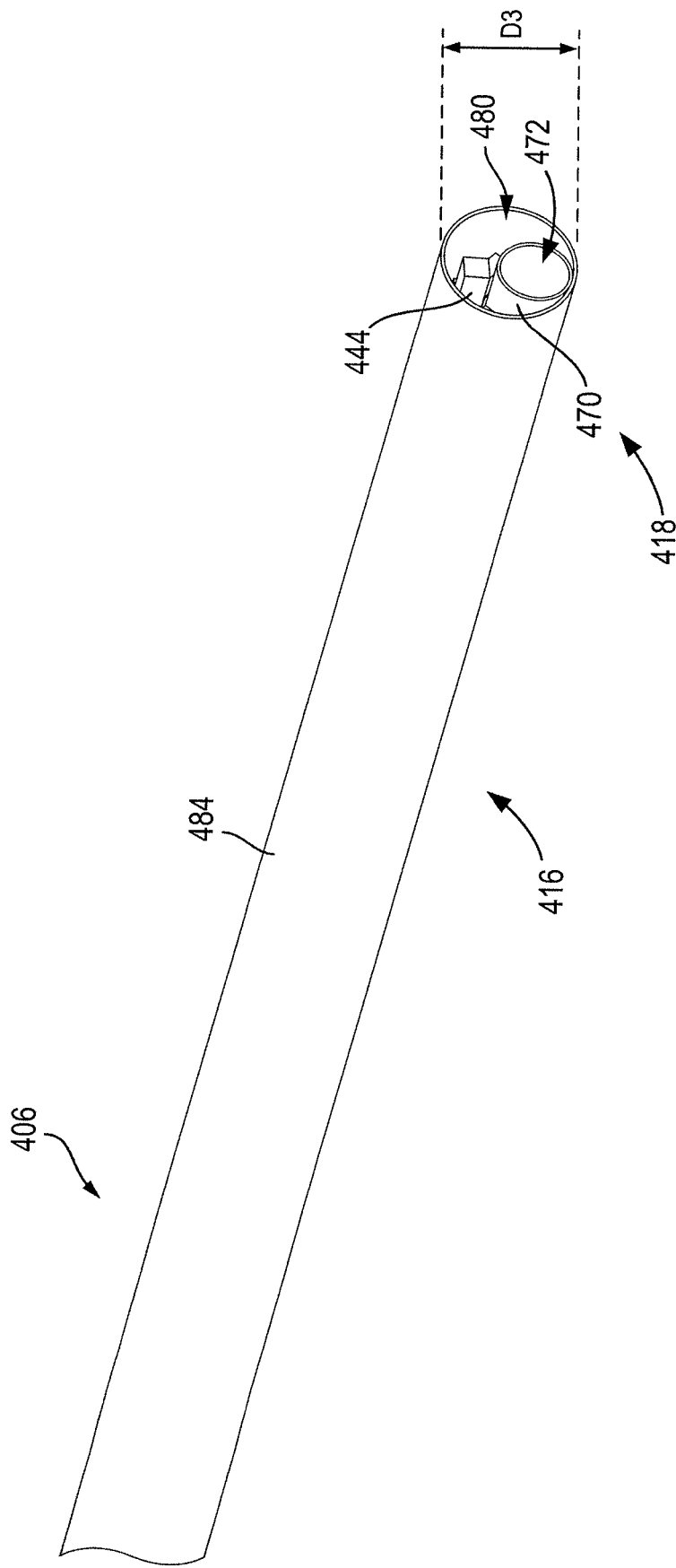
FIG. 4 depicts a view of the distal end of an example endoscope.

FIG. 4 depicts the distal end 416 of a fully fabricated example endoscope 406, where an outer jacket 484 has been added to the exterior endoscope 406. The outer jacket 484 is a thin-walled tube that seals the endoscope 406 while allowing articulation of the steerable tip 418, and flexion along the length of the endoscope 406. Accordingly, the outer jacket 484 may be fabricated using a material with a high degree of flexibility, such as a thin polyurethane extrusion, or other type flexible material. In some examples, the thickness of the outer jacket 484 may be substantially less than 1 mm, and the finished outer diameter D3 of the endoscope 406 may be approximately 5 mm or less. In other examples, the outer diameter D3 may be more or less than 5 mm.

A transparent or semi-transparent sealant may be applied to a portion of the distal aperture 480, in the space between the guide tube 470 and outer jacket 484, leaving the distal end of the working channel 472 open to an internal cavity of the patient. The sealant protects the electrical elements of the flexible circuit board (e.g., board 230, 330) while allowing light generated by the light source (e.g., LEDs 346) to illuminate the patient cavity and the camera 444 to capture images of the patient cavity.

Figure 5:
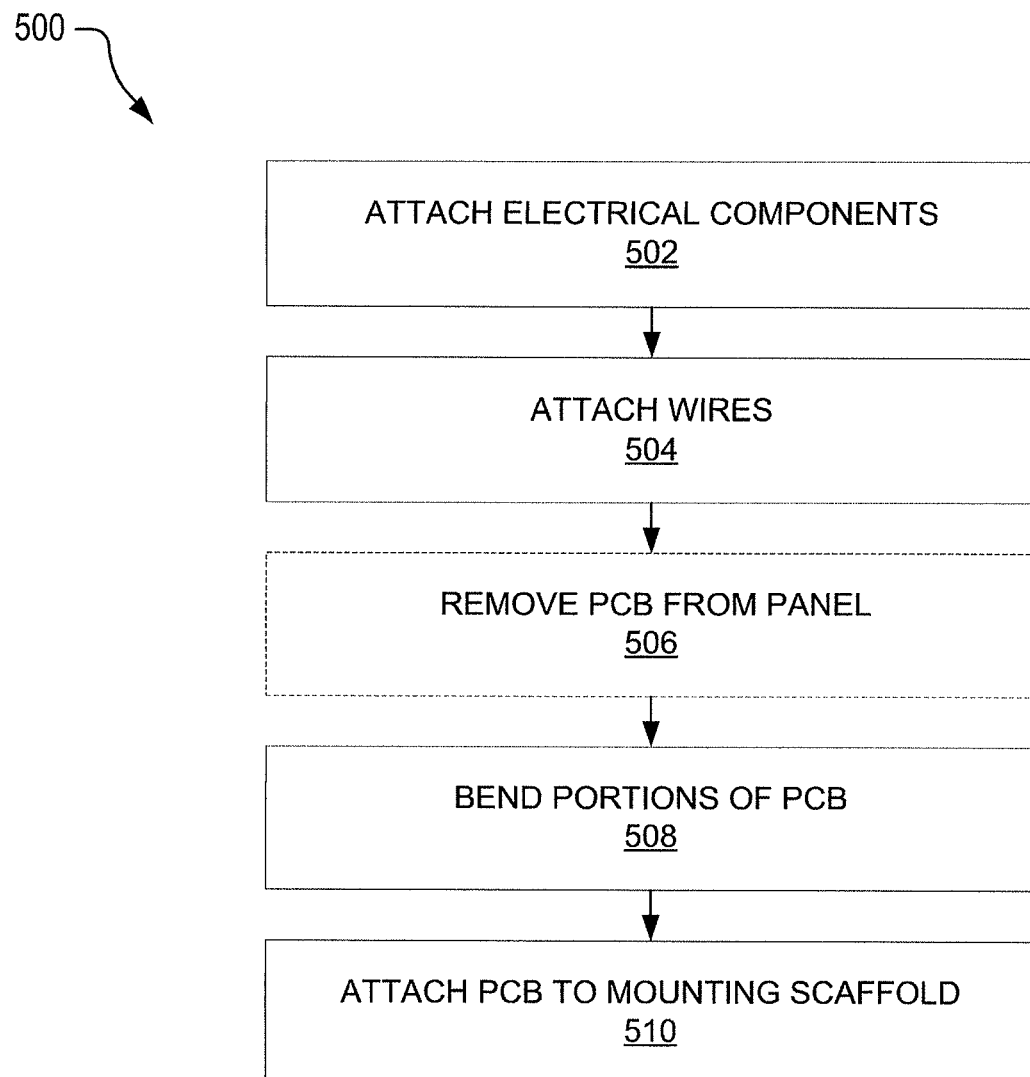
FIG. 5 depicts an example method for fabricating and installing an example flexible printed circuit board.

FIG. 5 depicts an example method 500 for populating a flexible printed circuit board (e.g., flexible PCB 230) and attaching the flexible circuit board to a mounting scaffold (e.g., mounting scaffold 360) of an endoscope steerable tip.

At operation 502, electrical components (e.g., components 334A-E, camera 344, LEDs 346, etc.) are attached to the flexible PCB. The components may be surface mount components, where the components are attached to surface mount pads on the PCB, or may be through-hole components, where the components are inserted through one or more holes in the PCB that are designed to receive leaded through-hole components. The components may be attached to one side of the PCB, or in some examples may be attached to both sides of the PCB. In some examples, the components may be manually placed on their respective pads for attachment or may be placed by an automated pick-and-place method.

The components may be attached by any of a variety of methods in which electrical contact is established between a pin or lead of the component and a pad or through-hole, respectively, of the PCB. In one example, the components may be attached to the PCB by a soldering method, such as reflow soldering, wave soldering, manual soldering, and/or other soldering methods. In another example, the components may be attached to the PCB by other methods, such as by conductive adhesive (e.g., conductive epoxy) or other method.

At operation 504, wires are attached to the flexible PCB. The wires may be used to provide electrical power to components of the PCB and to provide one or more connections used by the components of the PCB to transmit/receive signals. In some examples, the wires may be routed down the length of the endoscope and may connect the PCB to other electrical elements of the steerable endoscope, such as an electrical interface (e.g., electrical interface 123A) located at the proximal end of the endoscope, or other components associated with the endoscope.

In one example, the wires may be attached to wire pads associated with one or more wiring sections (e.g., wiring sections 236A-B) of the PCB, where the wire pads may provide for surface mount connection of the wires. In other examples, the wiring section and/or other portions of the PCB may provide through-holes for connecting the wires. In still other examples, the wiring section and/or other portions of the PCB may provide other types of connection points for the wires, such as pins, posts, or other features or elements suitable for connecting the wires. The wires may be connected to the wire pads (or other connection element) by one or more of the soldering methods described above for operation 504.

In some examples, the wires may be implemented as one or more cables that connect to the PCB by way of electrical connector(s). For example, two or more of the wires may be formed as a coaxial cable that includes a connector that attaches to a corresponding connector provided on the PCB. In other examples, the wires may be formed as another type of cable, such as an FPC, ribbon cable, or other type of cable, and connected to the wiring section and/or other portions of the PCB through suitable connectors.

At operation 506, in examples where the flexible PCB is provided as a part of a panel of multiple PCBs, the PCB is removed from the panel. In some examples, the PCB may be attached to the panel by a plurality of tabs that may be cut, broken, or snapped to remove the PCB from the panel. In other examples, the PCB may be removed from the panel by a routing process, such as a mechanical or laser routing process. In still other examples, the PCB may be removed by scoring and/or punching the PCB to remove it from the panel. In additional examples, any of a variety of methods may be used to remove the PCB from a panel.

At operation 508, portions of the flexible PCB may be bent or shaped such that the PCB is reconfigured from a substantially 2D configuration (e.g., flat or coplanar) to a 3D configuration. The flexible PCB may include flexible regions (e.g., flexible regions 248-50) comprising one or more flexible arms (e.g., flexible arms 252A-F) and one or more apertures (e.g., apertures 240A-C), or other areas with reduced circuit board material, that may increase circuit board flexibility. The flexible regions may connect different sections or portions of the PCB. For instance, a sensor section of the PCB may be connected to one or more wiring sections of the PCB by a flexible region. Force may be applied to one or more sections of the PCB to cause the flexible arms to bend, such that sections of the PCB are no longer substantially flat or coplanar.

In some examples, bending the PCB may include bending the PCB at the flexible arms or in the flexible regions, so that the shape of the PCB is maintained in a 3D configuration when the bending force is removed. For instance, characteristics of the PCB, such as compliance of the board material and amount of copper (or other conductive material) in the flexible region, may allow the PCB to maintain a 3D shape. The PCB may be bent, formed, etc., into a shape that facilitates attachment of the PCB to a mounting scaffold. For instance, force may be applied to wiring sections of the PCB to cause bending of the flexible arms that connect the wiring sections to the sensor section of the PCB (e.g., flexible arms 252A-D). In one example, bending of the flexible arms may cause the wiring sections to be oriented (and maintained) at a substantially 90-degree angle from the sensor section, as depicted in FIGS. 3A-C above. This configuration may facilitate attachment of the wiring sections to surfaces of the mounting scaffold.

In another example, bending forces may be applied to a camera system section (e.g., camera system section 242) and/or sensor section to cause the camera system section to be oriented and maintained at a substantially 90-degree angle from the sensor section. In this configuration, the camera system section may be oriented to direct the viewpoint of an included camera (e.g., camera 344) out of the endoscope steerable tip and into a patient cavity, when the PCB is installed in the steerable tip.

In other examples, the compliance of the board material, amount of board material, amount of copper (or other conductive material) in the flexible region, and/or other factors may not allow the flexible arms to maintain their shape when the bending force is removed. For instance, in examples where the PCB is fabricated using low compliance material, the flexible arms and/or other portions of the flexible PCB may exhibit a level of elasticity that serves to restore the shape of the flexible arms when the bending force is removed. As a result, the bend may not be maintained, or may only be partially maintained. In such examples, sections/portions of the PCB may be bent into position and immediately attached the mounting scaffold, as described below.

At operation 510, the PCB or portions of the PCB are attached to the mounting scaffold. The PCB may be attached by any of a variety of attachment methods. As describe above, the PCB may be attached using a type of adhesive, such as epoxy, UV glue, PSA, or the like. In some examples, the PCB may be attached by mechanical methods, such as with bolts, retention tabs or guides, and/or other types of mechanical methods. In other examples, the PCB may be attached using a combination of the above methods, and/or other methods.

Attaching the PCB to the mounting scaffold may include the use of mounting posts (e.g., mounting posts 374A-B), or other types of mounting or alignment features provided on the mounting scaffold to position and/or orient one or more portions of the PCB. For instance, mounting posts may be provided on a front surface of the mounting scaffold (e.g., front surface 368) for aligning the camera system section of the PCB, and the camera included thereon, with the working channel (e.g., working channel 372) or another feature of the endoscope steerable tip. Portions of the PCB may include features, such as apertures, slots, and/or other features that receive the mounting posts and participate in orienting and/or aligning portions of the PCB.

In some examples, attaching the PCB to the mounting scaffold may also include the addition of a stiffener or other element that provides a rigid substrate beneath electrical components. For example, a stiffener may be included between the sensor section of the PCB and the mounting scaffold, or underneath other areas of the PCB where electrical components are attached. The stiffener may reduce the possibility of detachment of the electrical components during operation of the steerable endoscope. The stiffener may be attached as described above, using epoxy, PSA, or the like.

In examples, operations performed as part of example method 500 may be performed in an alternative order. As one example, the attachment of wires (operation 504) may be performed after the PCB is removed from the panel (operation 506). In another example, the wires may be attached (operation 504) after the flexible PCB is attached to the mounting scaffold (operation 510). In yet another example, bending forces may be applied to portions of the PCB (operation 508) after one or more portions of the PCB have been attached to the mounting scaffold (operation 510). For example, the sensor section may be attached to a top surface of the mounting scaffold then bending force may be applied to remaining sections/portions of the PCB to complete the attachment.

Those skilled in the art will recognize that the methods and systems of the present disclosure may be implemented in many manners and as such are not to be limited by the foregoing aspects and examples. In other words, functional elements being performed by a single or multiple components. In this regard, any number of the features of the different aspects described herein may be combined into single or multiple aspects, and alternate aspects having fewer than or more than all of the features herein described are possible. Functionality may also be, in whole or in part, distributed among multiple components, in manners now known or to become known.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Numerous other changes may be made which will readily suggest themselves to those skilled in the art and which are encompassed in the spirit of the disclosure and as defined in the appended claims. While various aspects have been described for purposes of this disclosure, various changes and modifications may be made which are well within the scope of the disclosure. Numerous other changes may be made which will readily suggest themselves to those skilled in the art and which are encompassed in the spirit of the disclosure and as defined in the claims.

What is claimed is:

1. An endoscope with a steerable tip comprising:
  a working channel extending through the steerable tip;
  a foldable printed circuit board (PCB) extending at least partially around the working channel, the foldable PCB comprising:
    a planar sensor segment extending along a first plane, the sensor segment populated with at least one sensor;
    a planar camera segment extending along a second plane that is substantially orthogonal to the first plane and positioned distally from the sensor segment, the camera segment including an opening for the working channel and populated with a camera and at least one light source, wherein the planar camera segment is partially separated from the sensor segment by an aperture in the foldable PCB; and
    a bent arm extending between, and connecting, the sensor segment and the camera segment.

2. The endoscope of claim 1, wherein the bent arm is a first bent arm, and the flexible PCB further comprises a second bent arm extending between the sensor segment and the camera segment, wherein the aperture is positioned between the first bent arm and the second bent arm.

3. The endoscope of claim 1, wherein the bent arm is a first bent arm, and wherein the flexible PCB further comprises:
  a planar wiring segment including an attached wire that extends through the endoscope, the wiring segment extending along a third plane that is substantially orthogonal to the first plane and the second plane; and
  a second bent arm extending between the sensor segment and the wiring segment.

4. The endoscope of claim 3, wherein the wiring segment is a first wiring segment and the wire is a first wire, wherein the flexible PCB further comprises:
  a planar second wiring segment including an attached second wire extending though the endoscope, wherein the second wiring segment extends along a fourth plane that is substantially parallel to the third plane; and
  a third bent arm extending between the second wiring segment the sensor segment.

5. The endoscope of claim 4, wherein:
  the aperture is a first aperture;
  the first wiring segment is positioned laterally from the sensor segment and is partially separated from the sensor segment by a second aperture in the flexible PCB; and
  the second wiring segment is positioned laterally from the sensor segment and is partially separated from the sensor segment by a third aperture in the flexible PCB.

6. The endoscope of claim 1, wherein the sensor includes at least one of an inertial measurement unit (IMU), an accelerometer, or a gyroscope.

7. The endoscope of claim 1, wherein the camera is positioned between the opening and the aperture, and the at least one light source includes a first light source positioned on a first lateral side of the camera and a second light source positioned on a second lateral side of the camera.

8. The endoscope of claim 1, wherein the first wiring segment comprises at least two wire pads, and the second wiring segment comprises at least two wire pads.

9. A foldable printed circuit board (PCB) for inclusion in a steerable tip of an endoscope, the foldable PCB having a two-dimensional configuration and a three-dimensional configuration, the PCB comprising:
  a first bendable arm, a second bendable arm, and a third bendable arm;
  a planar sensor segment populated with at least one of an inertial measurement unit (IMU), an accelerometer, or a gyroscope;
  a planar camera segment positioned distally from the sensor segment and connected to the sensor segment via the first bendable arm, the planar camera segment populated with a camera and at least one light source, wherein the camera segment is partially separated from the sensor segment by an aperture;
  a first wiring segment positioned laterally from the sensor segment and proximally from the camera segment, the first wiring segment connected to the sensor segment via the second bendable arm and including at least two wiring pads; and
  a second wiring segment positioned laterally from the sensor segment and proximally from the camera segment, the second wiring segment connected to the sensor segment via the third bendable arm and including at least two wiring pads.

10. The foldable PCB of claim 9, wherein:
  the aperture is a first aperture;
  the first wiring segment is partially separated from the sensor segment by a second aperture; and
  the second wiring segment is partially separated from the sensor segment by a third aperture.

11. The foldable PCB of claim 10, wherein the first aperture is defined by the first bendable arm, a fourth bendable arm, the sensor segment and the camera segment.

12. The foldable PCB of claim 9, wherein the camera segment further includes an opening sized to allow for a working channel of the endoscope to pass through.

13. The foldable PCB of claim 12, wherein the camera is positioned between the opening and the aperture.

14. The foldable PCB of claim 13, wherein the at least one light source includes a first light source positioned on first lateral side of the camera and a second light source positioned on a second lateral side of the camera.

15. The foldable PCB of claim 9, wherein, when the foldable PCB is in the three-dimensional configuration:
   the planar sensor segment extends along a first plane; and
   the camera segment extends along a second plane that is substantially orthogonal to the first plane.

* * * * *